US012719154B2

(12) United States Patent
Huang et al.

(10) Patent No.: US 12,719,154 B2
(45) Date of Patent: Aug. 25, 2026

(54) ANTENNA AND BASE STATION DEVICE

(71) Applicant: HUAWEI TECHNOLOGIES CO., LTD., Shenzhen (CN)

(72) Inventors: Chen Huang, Dongguan (CN); Dingjiu Daojian, Dongguan (CN); Chengdai Xue, Dongguan (CN); Chao Ren, Segrate (IT)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 18/644,115

(22) Filed: Apr. 24, 2024

(65) Prior Publication Data

US 2024/0275028 A1 Aug. 15, 2024

Related U.S. Application Data

(63) Continuation of application No. PCT/CN2022/127224, filed on Oct. 25, 2022.

(30) Foreign Application Priority Data

Nov. 3, 2021 (CN) .......................... 202111294511.5

(51) Int. Cl.

| | |
|---|---|
| ***H01P 1/00*** | (2006.01) |
| ***H01Q 1/24*** | (2006.01) |
| ***H01Q 19/10*** | (2006.01) |
| ***H01Q 21/00*** | (2006.01) |
| ***H01Q 21/06*** | (2006.01) |

(52) U.S. Cl.
CPC ........... *H01Q 1/246* (2013.01); *H01Q 19/104* (2013.01); *H01Q 21/0006* (2013.01); *H01Q 21/061* (2013.01); *H01P 1/00* (2013.01)

(58) Field of Classification Search
None
See application file for complete search history.

(56) References Cited

U.S. PATENT DOCUMENTS

| | | | | |
|---|---|---|---|---|
| 10,158,165 | B2 * | 12/2018 | Sledkov | H01Q 1/246 |
| 11,552,385 | B2 * | 1/2023 | Xiao | H01Q 1/48 |
| 2018/0248256 | A1 * | 8/2018 | Xiao | H01Q 1/405 |
| 2018/0337443 | A1 * | 11/2018 | Bisiules | H01Q 1/246 |

FOREIGN PATENT DOCUMENTS

| | | | | |
|---|---|---|---|---|
| CN | 111384600 A * | 7/2020 | | H01Q 21/24 |
| WO | 2015038543 A3 | 5/2015 | | |

* cited by examiner

*Primary Examiner* — Dameon E Levi
*Assistant Examiner* — Anh Ho

(57) ABSTRACT

This disclosure provides an antenna and a base station device. The antenna includes: a plurality of first frequency band antenna groups; a plurality of second frequency band radiating elements; and a reflection plate on which a reflection plate through hole is provided. Each first frequency band radiating element includes: a first balun structure and a first signal transmission structure, which pass through the reflection plate through hole. A phase shifter includes a first phase shifter cavity, a choke cavity, and a first feed network signal transmission structure located in the first phase shifter cavity. A part that is of the first balun structure and that is located on a second side of the reflection plate is located in the choke cavity.

18 Claims, 15 Drawing Sheets

ANTENNA AND BASE STATION DEVICE

CROSS-REFERENCE TO RELATED APPLICATIONS

This application is a continuation of International Patent Application No. PCT/CN2022/127224, filed on Oct. 25, 2022, which claims priority to Chinese Patent Application No. 202111294511.5, filed on Nov. 3, 2021. The disclosures of the aforementioned applications are hereby incorporated by reference in their entireties.

TECHNICAL FIELD

This disclosure relates to the field of communications technologies, and in particular, to an antenna and a base station device.

BACKGROUND

With rapid development of wireless communications technologies, a requirement for communication performance is increasingly high, and a multi-band antenna emerges. However, when radiating elements working on different frequency bands coexist, interference between frequency bands (especially secondary radiation caused by induced signals generated, on a surrounding radiating element on another frequency band, by radiating elements working on different frequency bands in a radiation process) exists. Such interference causes interference to a normal communication signal, affects a coverage capability of an antenna, and further affects communication performance.

SUMMARY

An antenna and a base station device can reduce interference between radiating elements on different frequency bands, thereby improving a coverage capability of the antenna and improving communication performance.

According to a first aspect, an antenna is provided, including: a plurality of first frequency band antenna groups, where each first frequency band antenna group includes a phase shifter and a plurality of first frequency band radiating elements; a plurality of second frequency band radiating elements; and a reflection plate. A reflection plate through hole corresponding to each first frequency band radiating element is provided on the reflection plate. Each first frequency band radiating element includes: a first radiation structure, where the first radiation structure is located on a first side of the reflection plate; a first balun structure, where one part of the first balun structure is located on the first side of the reflection plate and is connected to the first radiation structure, the first balun structure passes through the reflection plate through hole, the other part of the first balun structure is located on a second side of the reflection plate, and the first balun structure is spaced from the reflection plate; and a first signal transmission structure, where the first signal transmission structure is spaced from the first balun structure, and the first signal transmission structure passes through the reflection plate through hole. The phase shifter is located on the second side of the reflection plate, the phase shifter includes a first phase shifter cavity, a choke cavity, and a first feed network signal transmission structure located in the first phase shifter cavity, and the choke cavity and the first phase shifter cavity share a part of a cavity wall. In each first frequency band antenna group, the part that is of the first balun structure in each first frequency band radiating element and that is located on the second side of the reflection plate is located in the choke cavity. In each first frequency band antenna group, the first signal transmission structure in each first frequency band radiating element is electrically connected to the first feed network signal transmission structure.

In a possible implementation, each first frequency band radiating element further includes a second signal transmission structure, the second signal transmission structure is spaced from the first balun structure, and the second signal transmission structure passes through the reflection plate through hole. The phase shifter further includes a second phase shifter cavity and a second feed network signal transmission structure located in the second phase shifter cavity, the choke cavity and the second phase shifter cavity share a part of a cavity wall, and the first phase shifter cavity and the second phase shifter cavity are located on two opposite sides of the choke cavity, respectively. In each first frequency band antenna group, the second signal transmission structure in each first frequency band radiating element is electrically connected to the second feed network signal transmission structure.

In a possible implementation, each first frequency band radiating element further includes a first signal exporting structure located outside the choke cavity and outside the first phase shifter cavity. A first signal connection hole corresponding to each first signal exporting structure is provided on a cavity wall that is of the first phase shifter cavity and that is away from the reflection plate. A second signal connection hole corresponding to each first signal exporting structure is provided on a cavity wall that is of the choke cavity and that is away from the reflection plate. The first signal exporting structure is connected to the first signal transmission structure through the corresponding second signal connection hole, and the first signal exporting structure is connected to the first feed network signal transmission structure through the corresponding first signal connection hole. Each first frequency band radiating element further includes a second signal exporting structure located outside the choke cavity and outside the second phase shifter cavity. A third signal connection hole corresponding to each second signal exporting structure is provided on a cavity wall that is of the second phase shifter cavity and that is away from the reflection plate. A fourth signal connection hole corresponding to each second signal exporting structure is provided on the cavity wall that is of the choke cavity and that is away from the reflection plate. The second signal exporting structure is connected to the second signal transmission structure through the corresponding fourth signal connection hole, and the second signal exporting structure is connected to the second feed network signal transmission structure through the corresponding third signal connection hole.

In a possible implementation, a cavity wall of the choke cavity is electrically connected to the reflection plate; and an end that is of the part of the first balun structure in the choke cavity and that is away from the reflection plate is connected to the cavity wall of the choke cavity.

In a possible implementation, in each first frequency band antenna group, the plurality of first frequency band radiating elements are arranged in a first direction, the first phase shifter cavity, the choke cavity, and the second phase shifter cavity are arranged in a second direction, the first direction is perpendicular to the second direction, and the first direction and the second direction are both parallel to a plane on which the reflection plate is located. A height of the choke cavity is less than one half of a wavelength corresponding to a center frequency of an operating frequency band of the second frequency band radiating element, and the height of the choke cavity is a dimension of the choke cavity in a direction perpendicular to the plane on which the reflection plate is located. A width of the choke cavity is less than one third of the wavelength corresponding to the center frequency of the operating frequency band of the second frequency band radiating element, and the width of the choke cavity is a dimension of the choke cavity in the second direction.

In a possible implementation, the first frequency band radiating element is a dual-polarized radiating element, the first signal transmission structure is configured to perform feeding in a first polarization direction, and the second signal transmission structure is configured to perform feeding in a second polarization direction.

In a possible implementation, in the choke cavity, a dielectric material is coated around the first balun structure.

In a possible implementation, an operating frequency band of the first frequency band radiating element is greater than an operating frequency band of the second frequency band radiating element.

In a possible implementation, each second frequency band radiating element includes a second radiation structure and a second balun structure, the second radiation structure and the second balun structure are located on the first side of the reflection plate, and the second balun structure is connected to the reflection plate.

According to a second aspect, a base station device is provided, including the foregoing antenna.

According to the antenna in the embodiment of this disclosure, the phase shifter and the first frequency band radiating element are combined, and a part of a cavity wall of the first phase shifter cavity in the phase shifter is used to form the choke cavity. The choke cavity may be used to suppress a signal of the second frequency band radiating element in a signal transmission or feeding process, thereby reducing interference between radiating elements on different frequency bands, improving a coverage capability of the antenna, and improving communication performance. In addition, the choke cavity is formed by using a combination of the phase shifter and the first frequency band radiating element, thereby improving space utilization. In addition, for a plurality of first frequency band radiating elements in a same first frequency band antenna group, because the radiating elements are not isolated from each other, a plurality of radiating elements in the radiating elements may be excited by using a 1-to-2 power splitter or another type of power splitter, thereby increasing application scenarios of the antenna.

DESCRIPTION OF EMBODIMENTS

Terms used in embodiments of this disclosure are only used to explain specific embodiments of this disclosure, but are not intended to limit this disclosure.

Figure 1:
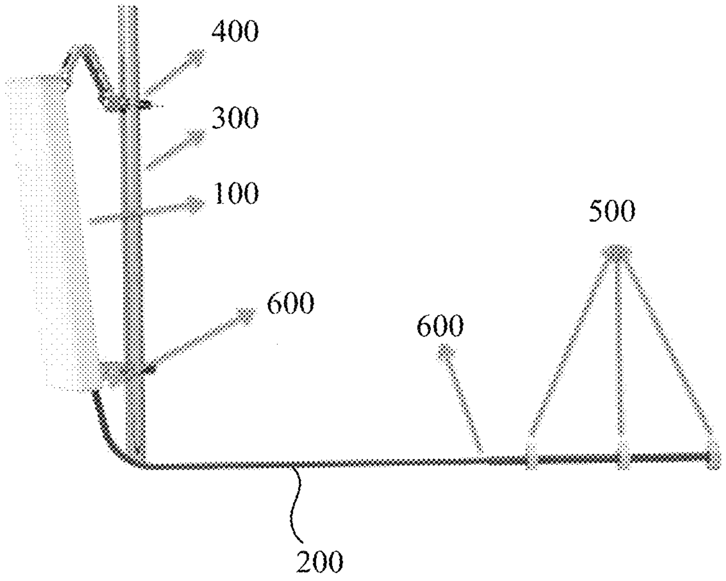
FIG. 1 is a diagram of a structure of a base station device according to an embodiment of this disclosure.
Figure 2:
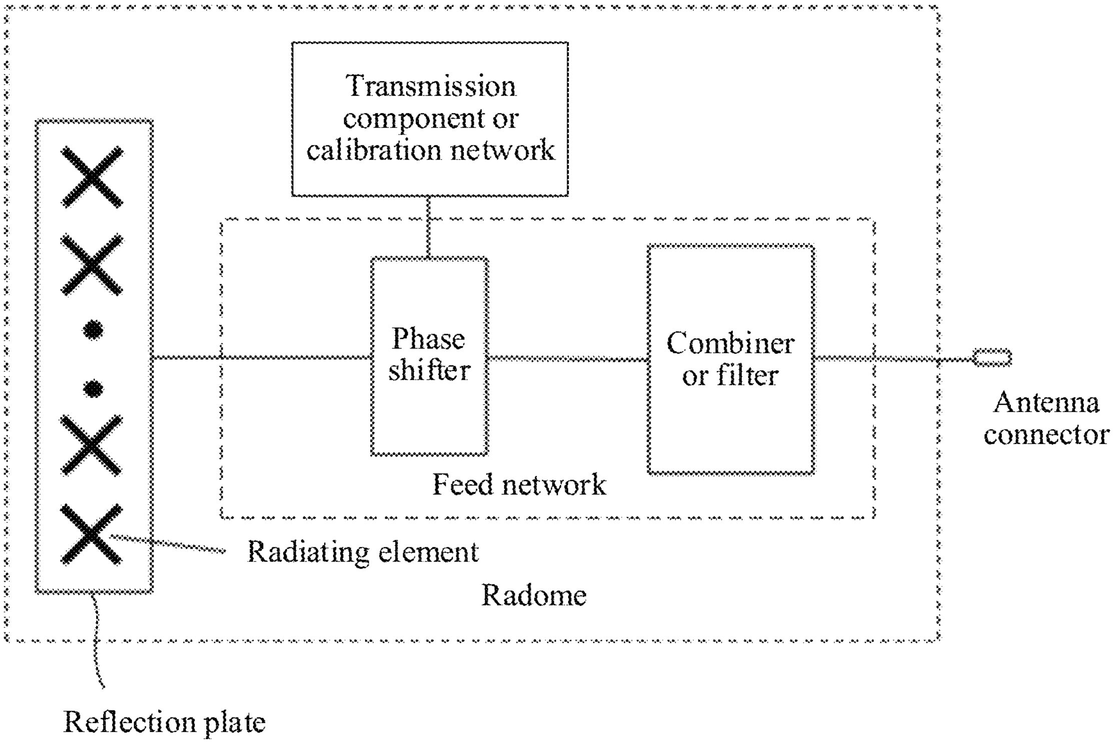
FIG. 2 is a diagram of a structure of an antenna according to an embodiment of this disclosure.

A basic architecture in embodiments of this disclosure is first described. Embodiments of this disclosure relate to a base station device. The base station device includes a base station antenna system. As shown in FIG. 1, the base station antenna system includes an antenna 100, a feeder 200, a pole 300, an antenna adjustment support 400, a grounding apparatus 500, and the like. The feeder 200 has a connector sealing piece 600, and the connector sealing piece 600 may be, for example, formed by an insulation sealing tape or a polyvinyl chloride (PVC) insulation tape. As shown in FIG. 2, a radiating element is also referred to as an antenna element, an element, or the like, and is a unit for forming a basic structure of an antenna array. The radiating element can effectively radiate or receive a radio wave. The antenna includes at least one antenna array including a plurality of radiating elements and a reflection plate. Different radiating elements may correspond to a same frequency or different frequencies. The radiating elements are usually placed on the reflection plate, and the reflection plate is usually made of a metal material. The reflection plate is also referred to as a base plate, an antenna panel, a metal reflection surface, or the like, and is configured to improve receive sensitivity for antenna signals, and focus antenna signals on a receiving point through reflection. The reflection plate not only enhances receiving and transmitting capabilities of the antenna, but also blocks and shields interference of other electric waves from the back (an opposite direction) to received signals. The antenna further includes a feed network. The antenna arrays receive or transmit radio frequency signals by using respective feed networks. That is, the feed network feeds a signal to the radiating element based on an amplitude and a phase, or sends a received radio signal to a signal processing unit of the base station based on an amplitude and a phase. The feed network includes a controlled impedance transmission line, configured to implement impedance matching. The feed network includes a phase shifter. The phase shifter is configured to adjust a phase of a received or transmitted signal. The feed network may further include a component such as a combiner or a filter that is configured to extend performance. The antenna may further include a transmission component, and adjustment between different radiation beam directions may be implemented by using the transmission component. The antenna may further include a calibration network, configured to obtain a calibrated signal. The foregoing components in the antenna may be disposed in a radome. The feed network is connected to the signal processing unit (not shown in the figure) of the base station by using an antenna connector. The radome is a structural part that protects the antenna system from being affected by an external environment. The radome has a good electromagnetic wave penetration characteristic in terms of electrical performance, and can withstand a harsh external environment in terms of mechanical performance.

Before embodiments of this disclosure are described, a related technology and a technical problem thereof are described.

Figure 3:
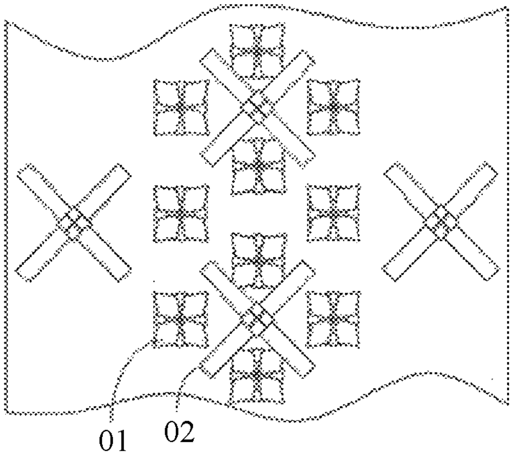
FIG. 3 is a top view of an antenna in a related technology.
Figure 4:
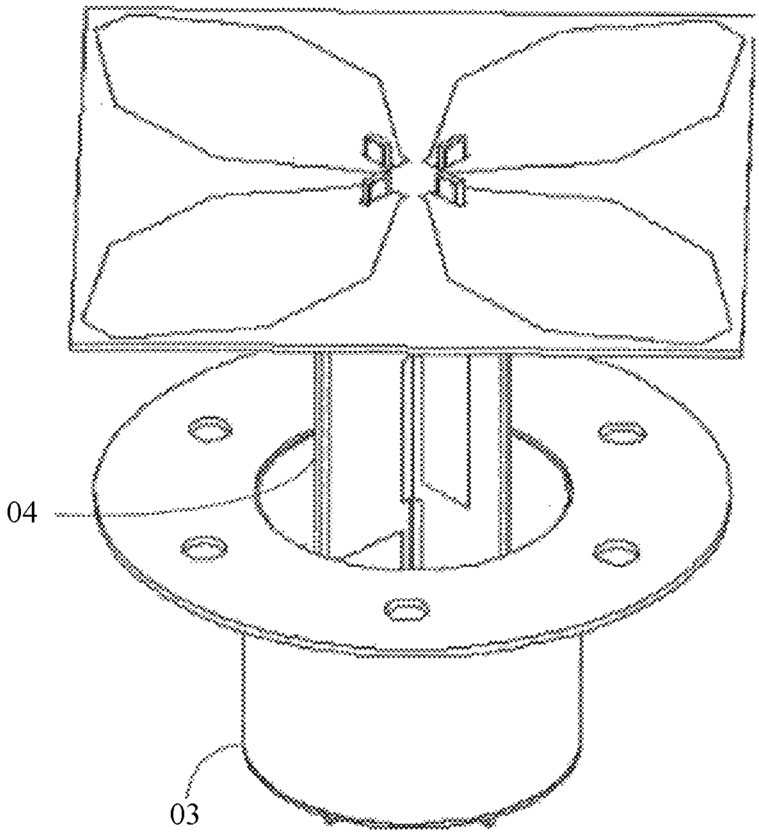
FIG. 4 is a three-dimensional diagram of a partial structure in FIG. 3.
Figure 5:
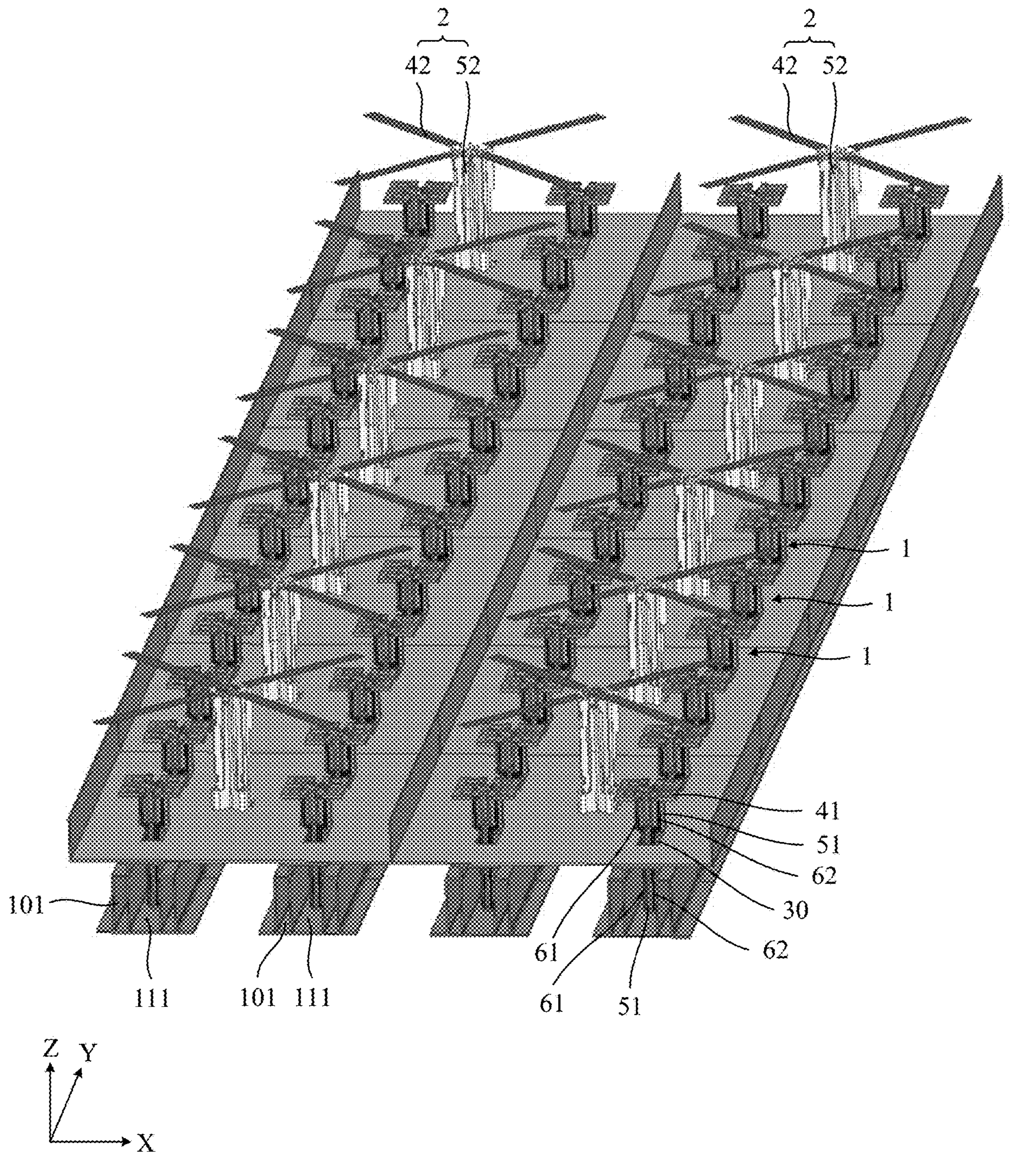
FIG. 5 is a diagram of a partial structure of an antenna according to an embodiment of this disclosure.
Figure 6:
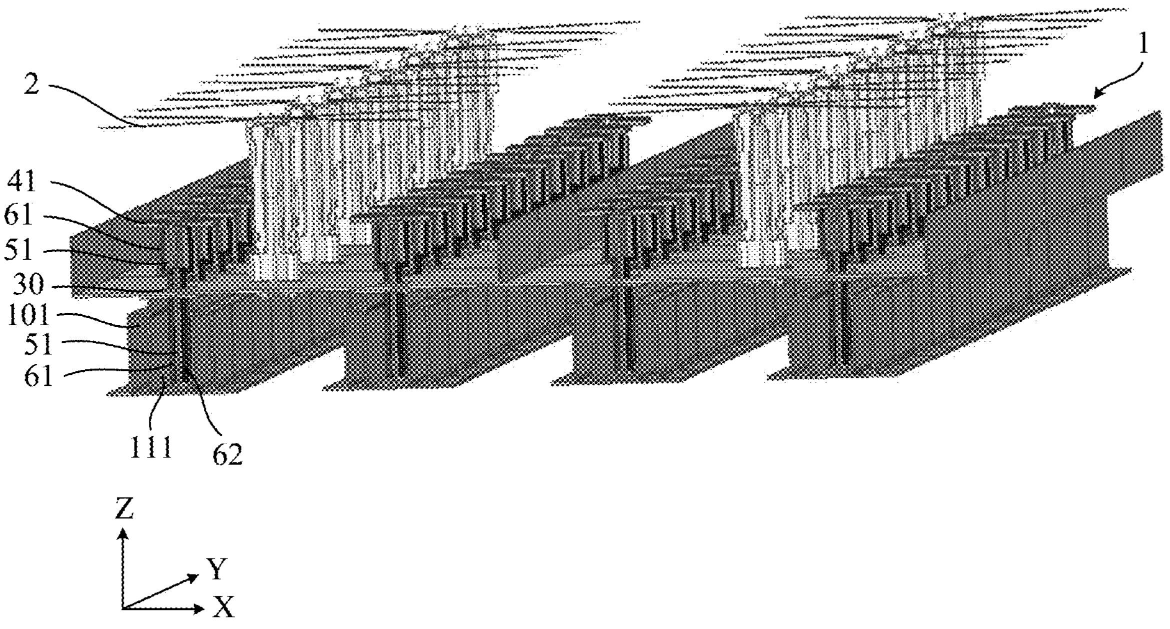
FIG. 6 is a diagram of the antenna in FIG. 5 from another perspective.
Figure 7:
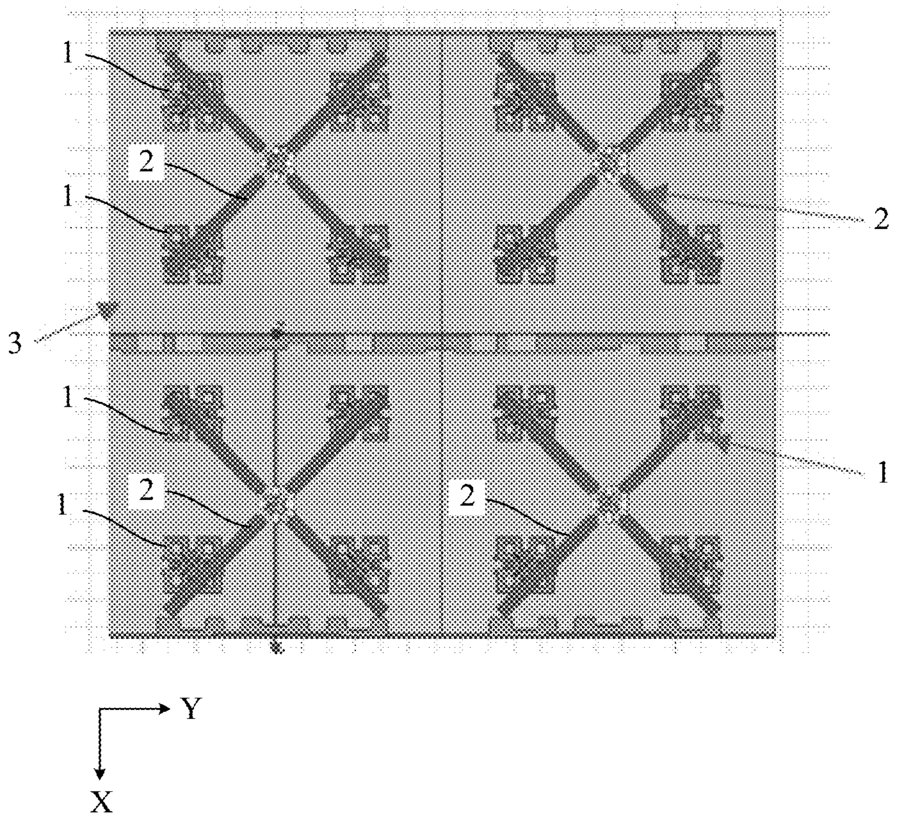
FIG. 7 is a top view of a partial structure in FIG. 5.
Figure 8:
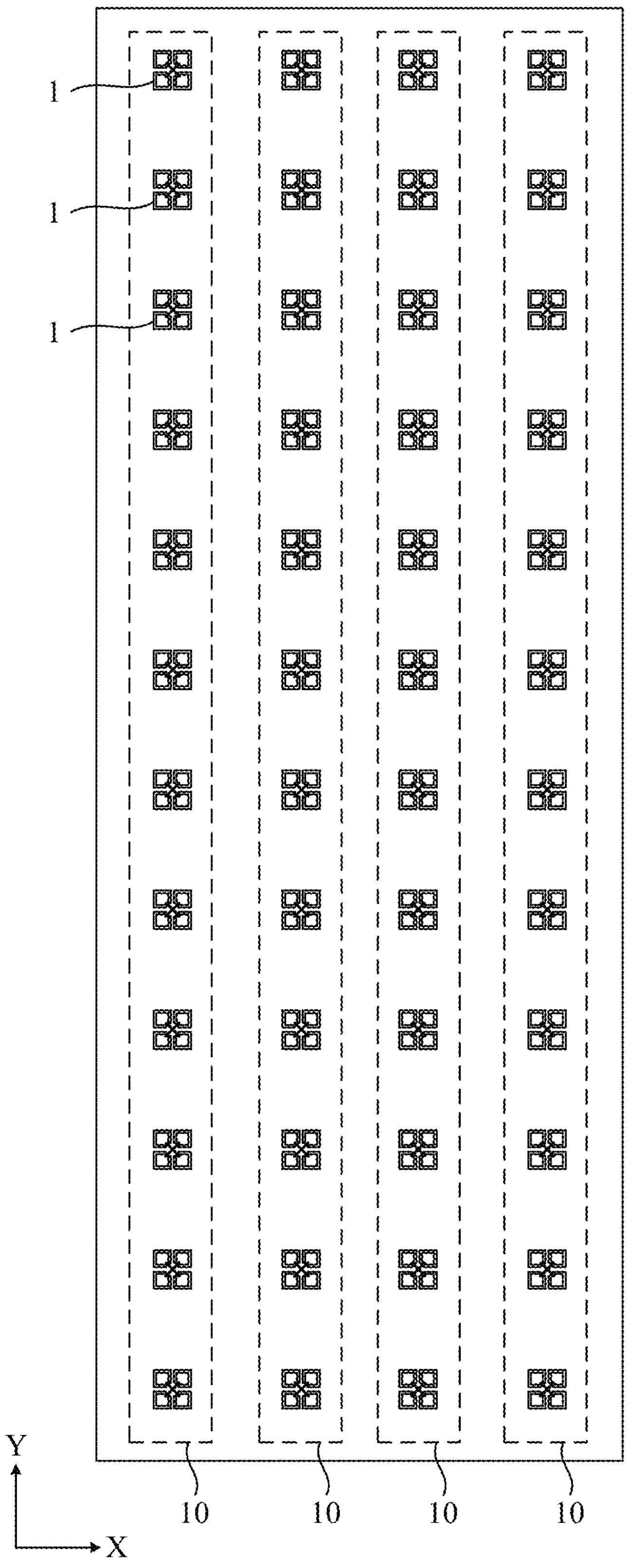
FIG. 8 is a top view when second frequency band radiating elements are omitted in FIG. 5.
Figure 9:
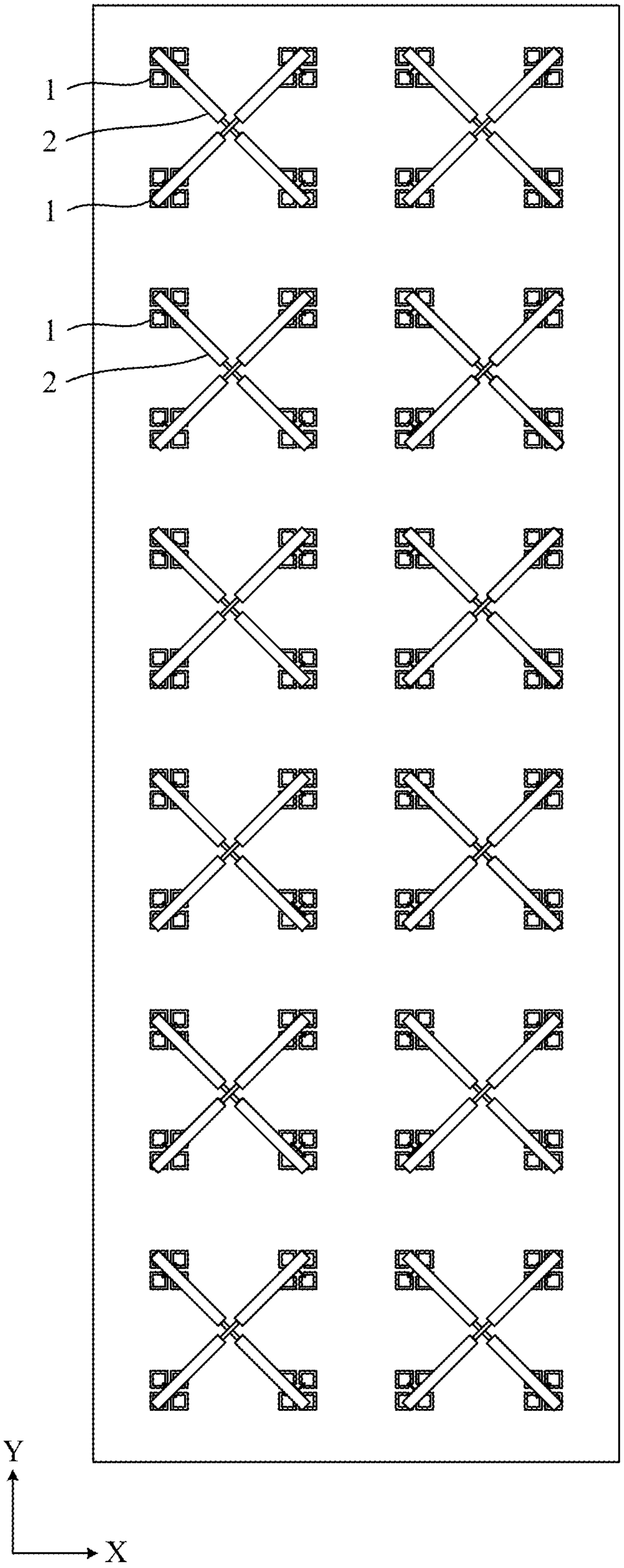
FIG. 9 is a top view when second frequency band radiating elements are included in FIG. 5.

In the related technology, an antenna system includes a plurality of antenna bays. One of the antenna bays works on a frequency band of 690 MHz to 960 MHz and includes low-frequency radiating elements. Another antenna bay in the plurality of antenna bays works on a frequency band of 1.4 GHz to 2.7 GHz and includes high-frequency radiating elements. When the antenna bay working on the frequency band of 690 MHz to 960 MHz works, a signal in the frequency band of 690 MHz to 960 MHz is induced on the another antenna bay. Secondary radiation of the induced signal can interfere with an existing low-frequency signal, and integrity of a directivity pattern of the frequency band of 690 MHz to 960 MHz is affected. To resolve this problem, an antenna structure shown in FIG. 3 and FIG. 4 is provided. The antenna structure includes a high-frequency radiating element 01 and a low-frequency radiating element 02. In the structure, a part of a balun structure 04 corresponding to each high-frequency radiating element 01 is wrapped by using a structure 03, to reduce signal interference between radiating elements on different frequency bands. However, this structure brings two problems. One is that extra space is required to dispose the structure 04, thereby increasing a size of the antenna. The other problem is that because the balun structure 04 of each high-frequency radiating element 01 is separately wrapped and isolated, each high-frequency radiating element 01 can only be separately excited. If two high-frequency radiating elements 01 need to be excited by using one 1-to-2 power splitter, because the balun structures 04 of the two high-frequency radiating elements 01 are isolated by the structures 04, the two high-frequency radiating elements 01 cannot be simultaneously excited by using one 1-to-2 power splitter. Consequently, application scenarios of the antenna are reduced. To resolve the foregoing problems, technical solutions in embodiments of this disclosure are provided. The following describes the technical solutions in embodiments of this disclosure.

As shown in FIG. 5 to FIG. 13, an embodiment of this disclosure provides an antenna, including: a plurality of first frequency band antenna groups 10, where each first frequency band antenna group 10 includes a phase shifter 20 and a plurality of first frequency band radiating elements 1; a plurality of second frequency band radiating elements 2; and a reflection plate 3. A reflection plate through hole 30 corresponding to each first frequency band radiating element 1 is provided on the reflection plate 3. Each first frequency band radiating element 1 includes: a first radiation structure 41, where the first radiation structure 41 is located on a first side of the reflection plate 3, and the first side is an upper side of the reflection plate 3 in FIG. 10; a first balun structure 51, where one part of the first balun structure 51 is located on the first side of the reflection plate 3 and is connected to the first radiation structure 41, the first balun structure 51 passes through the reflection plate through hole 30, the other part of the first balun structure 51 is located on a second side of the reflection plate 3, the second side is a lower side of the reflection plate 3 in FIG. 10, and the first balun structure 51 is spaced from the reflection plate 3; and a first signal transmission structure 61, where the first signal transmission structure 61 is spaced from the first balun structure 51, and the first signal transmission structure 61 passes through the reflection plate through hole 30. That is, one part of the first signal transmission structure 61 is located on the first side of the reflection plate 3, and the other part is located on the second side of the reflection plate 3. The first signal transmission structure 61 is configured to feed the first frequency band radiating element 1. The first signal transmission structure 61 and the first balun structure 51 may be separated by using a dielectric layer, or may be separated by air. If the first signal transmission structure 61 and the first balun structure 51 are separated by air, a support structure needs to be disposed at a position between the first signal transmission structure 61 and the first balun structure 51, to implement a function of supporting and fastening the first signal transmission structure 61. The phase shifter 20 is located on the second side of the reflection plate 3, and the phase shifter 20 includes a first phase shifter cavity 101, a choke cavity 111, and a first feed network signal transmission structure 71 located in the first phase shifter cavity 101. The choke cavity 111 and the first phase shifter cavity 101 share a part of a cavity wall. The first feed network signal transmission structure 71 is configured to transmit a signal in the first phase shifter cavity 101. The first phase shifter cavity 101 may change a phase of a signal transmitted by the first feed network signal transmission structure 71 (the first feed network signal transmission structure 71 is not shown in FIG. 5 to FIG. 9). In each first frequency band antenna group 10, the part that is of the first balun structure 51 in each first frequency band radiating element 1 and that is located on the second side of the reflection plate 3 is located in the choke cavity 111, and the choke cavity 111 is configured to suppress a signal of a second frequency band radiating element 2. In each first frequency band antenna group 10, the first signal transmission structure 61 in each first frequency band radiating element 1 is electrically connected to the first feed network signal transmission structure 71, the first feed network signal transmission structure 71 extends along the cavity in the first phase shifter cavity 101 to transmit a signal, and the first phase shifter cavity 101 extends to a vicinity of each first frequency band radiating element 1 in the first frequency band antenna group 10 and is electrically connected to each first signal transmission structure 61 in the same group.

It should be noted that the accompanying drawings in FIG. 5 to FIG. 13 are merely diagrams, and structures in different diagrams may be different or cannot be corresponding to each other, but a relationship of main structures is not affected.

Specifically, one first frequency band antenna group 10 corresponds to a plurality of first frequency band radiating elements 1 and one phase shifter 20, a part of the first balun structure 51 of each first frequency band radiating element 1 in a same first frequency band antenna group 10 is located in a same choke cavity 111, and the first signal transmission structure 61 of each first frequency band radiating element 1 in a same first frequency band antenna group 10 is electrically connected to a same first feed network signal transmission structure 71 in a same first phase shifter cavity 101. For example, in a signal radiation process of the antenna, radio frequency signals are first transmitted to the first feed network signal transmission structure 71 in the first phase shifter cavity 101, and are transmitted along the first feed network signal transmission structure 71. Then, the signals are transmitted to a plurality of first signal transmission structures 61, the first frequency band radiating elements 1 are fed by using the first signal transmission structures 61, and the first radiation structures 41 are used for radiation.

According to the antenna in this embodiment of this disclosure, the phase shifter 20 and the first frequency band radiating element 1 are combined, and a part of a cavity wall of the first phase shifter cavity 101 in the phase shifter 20 is used to form the choke cavity 111. The choke cavity 111 may be used to suppress a signal of the second frequency band radiating element 2 in a signal transmission or feeding process, thereby reducing interference between radiating elements on different frequency bands, improving a coverage capability of the antenna, and improving communication performance. In addition, the choke cavity 111 is formed by using a combination of the phase shifter 20 and the first frequency band radiating element 1, thereby improving space utilization. In addition, for a plurality of first frequency band radiating elements 1 in a same first frequency band antenna group 10, because the radiating elements are not isolated from each other, a plurality of radiating elements in the radiating elements may be excited by using a 1-to-2 power splitter or another type of power splitter, thereby increasing application scenarios of the antenna.

Figure 10:
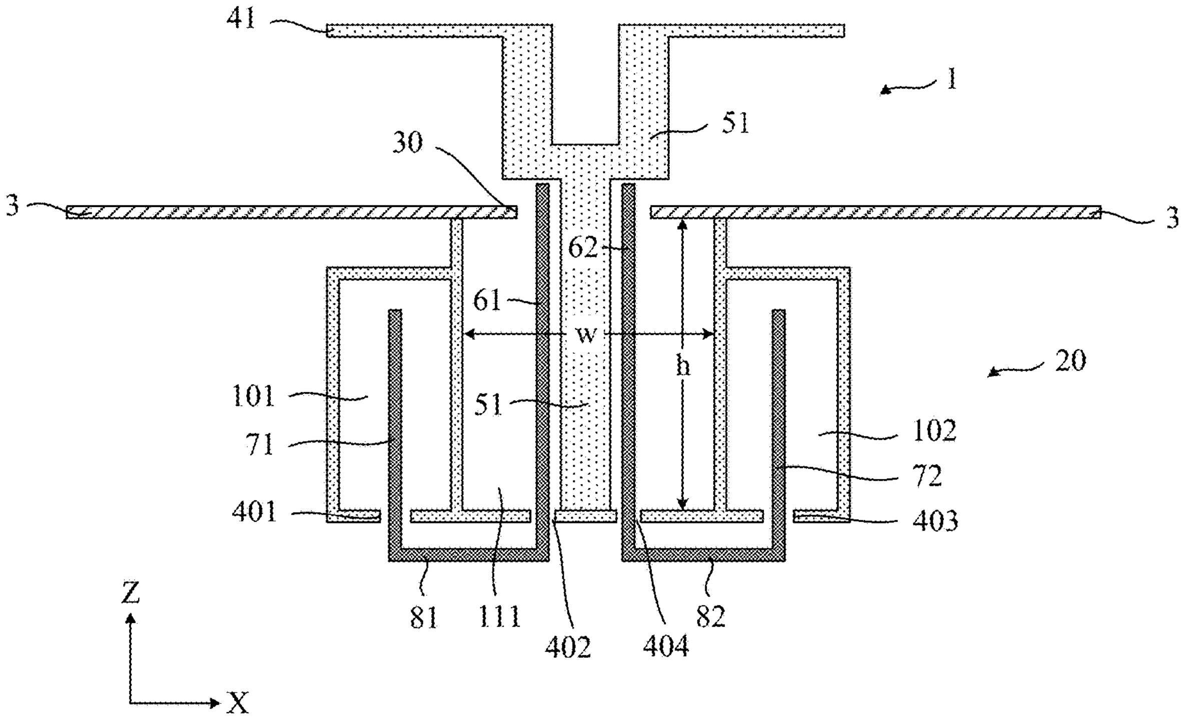
FIG. 10 is a cross-sectional diagram of a partial structure in FIG. 5.
Figure 11:
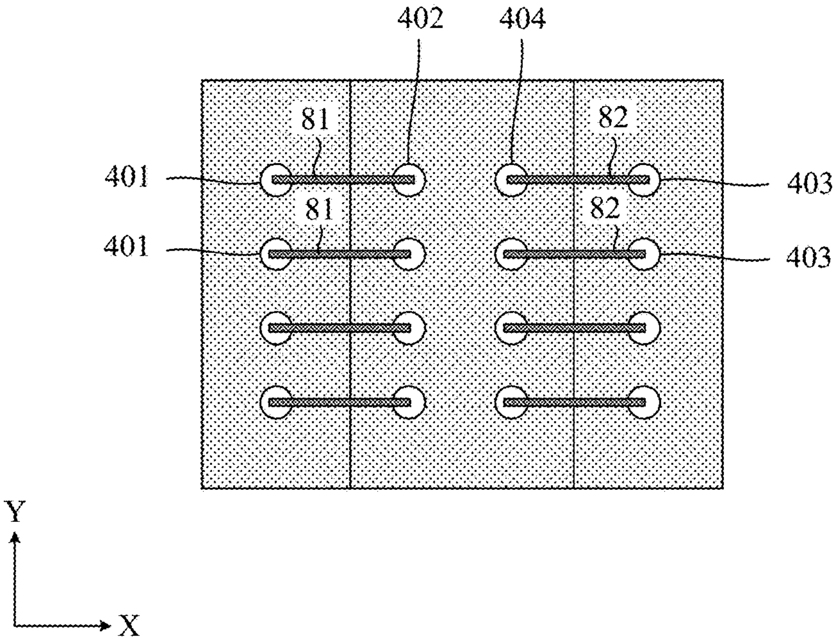
FIG. 11 is a bottom view of a partial structure in FIG. 5.
Figure 12:
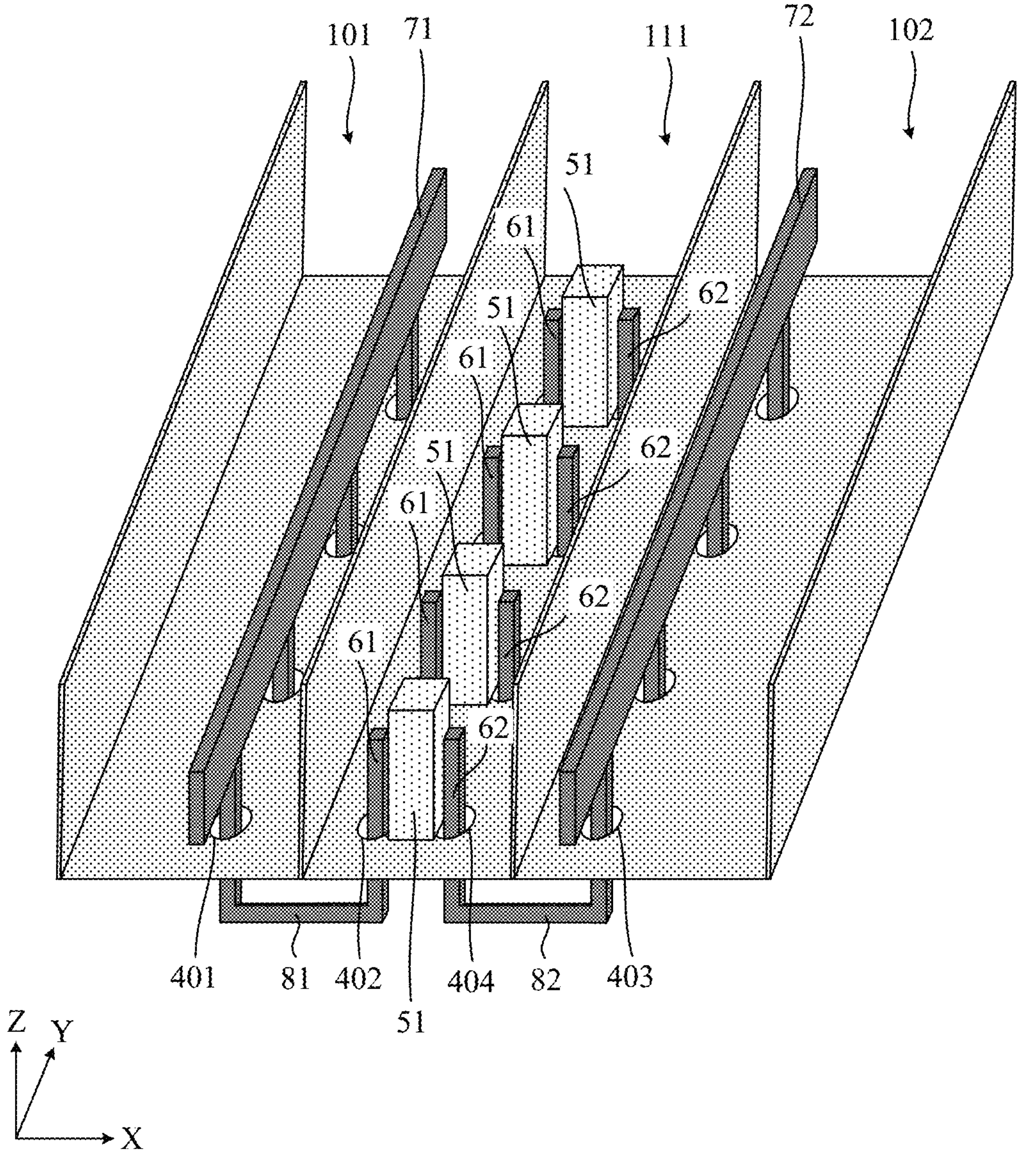
FIG. 12 is a diagram of an internal structure of a partial phase shifter and a choke cavity in FIG. 5.

In a possible implementation, each first frequency band radiating element 1 further includes a second signal transmission structure 62, the second signal transmission structure 62 is spaced from the first balun structure 51, and the second signal transmission structure 62 passes through the reflection plate through hole 30. The phase shifter 20 further includes a second phase shifter cavity 102 and a second feed network signal transmission structure 72 located in the second phase shifter cavity 102. The choke cavity 111 and the second phase shifter cavity 102 share a part of a cavity wall. The first phase shifter cavity 101 and the second phase shifter cavity 102 are located on two opposite sides of the choke cavity 111, respectively. In each first frequency band antenna group 10, the second signal transmission structure 62 in each first frequency band radiating element 1 is electrically connected to the second feed network signal transmission structure 72. The first signal transmission structure 61 and the second signal transmission structure 62 may be configured to implement feeding in different polarization directions, so that the first frequency band radiating element 1 radiates in the two polarization directions, to implement, for example, a dual-polarized antenna. Signals corresponding to the two polarization directions are fed through different signal transmission structures, and two phase shifter cavities corresponding to the signals in the two polarization directions need to be disposed. The two phase shifter cavities are disposed on the two opposite sides of the choke cavity 111, so that side walls of the two phase shifter cavities are used to form side walls of the choke cavity 111, to improve space utilization, and enable the choke cavity 111 to have a better effect of suppressing a signal of an antenna on another frequency band. For example, as shown in FIG. 10, the first phase shifter cavity 101 is located on the left side of the choke cavity 111, and the first phase shifter cavity 101 and the choke cavity 111 share a part of a cavity wall between the two; and the second phase shifter cavity 102 is located on the right side of the choke cavity 111, and the second phase shifter cavity 102 and the choke cavity 111 share a part of a cavity wall between the two.

In a possible implementation, as shown in FIG. 5 to FIG. 13, each first frequency band radiating element 1 further includes a first signal exporting structure 81 located outside the choke cavity 111 and outside the first phase shifter cavity 101. A first signal connection hole 401 corresponding to each first signal exporting structure 81 is provided on a cavity wall that is of the first phase shifter cavity 101 and that is away from the reflection plate 3. A second signal connection hole 402 corresponding to each first signal exporting structure 81 is provided on a cavity wall that is of the choke cavity 111 and that is away from the reflection plate 3. The first signal exporting structure 81 is connected to the first signal transmission structure 61 through the corresponding second signal connection hole 402, and the first signal exporting structure 81 is connected to the first feed network signal transmission structure 71 through the corresponding first signal connection hole 401, so that the first feed network signal transmission structure 71 is electrically connected to all first signal transmission structures 61 in the same first frequency band antenna group 10. Each first frequency band radiating element 1 further includes a second signal exporting structure 82 located outside the choke cavity 111 and outside the second phase shifter cavity 102. A third signal connection hole 403 corresponding to each second signal exporting structure 82 is provided on a cavity wall that is of the second phase shifter cavity 102 and that is away from the reflection plate 3. A fourth signal connection hole 404 corresponding to each second signal exporting structure 82 is provided on a cavity wall that is of the choke cavity 111 and that is away from the reflection plate 3. The second signal exporting structure 82 is connected to the second signal transmission structure 62 through the corresponding fourth signal connection hole 404, and the second signal exporting structure 82 is connected to the second feed network signal transmission structure 72 through the corresponding third signal connection hole 403, so that the second feed network signal transmission structure 72 is electrically connected to all second signal transmission structures 62 in the same first frequency band antenna group 10.

In a possible implementation, the cavity wall of the choke cavity 111 is electrically connected to the reflection plate 3, so that when the reflection plate 3 is connected to a fixed potential, for example, when the reflection plate 3 is grounded, the cavity wall of the choke cavity 111 is also grounded. An end that is of the part of the first balun structure 51 in the choke cavity 111 and that is away from the reflection plate 3 is connected to the cavity wall of the choke cavity 111. That is, the first balun structure 51 does not directly connect to the reflection plate 3 at a position of the reflection plate 3 to implement grounding, but connects to the cavity wall at the bottom of the choke cavity 111 after passing through the reflection plate through hole 30 to implement grounding.

In a possible implementation, in each first frequency band antenna group 10, a plurality of first frequency band radiating elements 1 are arranged in a first direction Y. For example, in this embodiment of this disclosure, four columns of first frequency band radiating elements 1 and two columns of second frequency band radiating elements 2 are shown. The first phase shifter cavity 101, the choke cavity 111, and the second phase shifter cavity 102 are arranged in a second direction X. The first direction Y is perpendicular to the second direction X, and the first direction Y and the second direction X are both parallel to a plane on which the reflection plate 3 is located. A height h of the choke cavity 111 is less than one half of a wavelength corresponding to a center frequency of an operating frequency band of the second frequency band radiating element 2, and the height h of the choke cavity 111 is a dimension of the choke cavity 111 in a direction perpendicular to the plane on which the reflection plate 3 is located, that is, a dimension of the choke cavity 111 in the first direction Y. A width w of the choke cavity 111 is less than one third of the wavelength corresponding to the center frequency of the operating frequency band of the second frequency band radiating element 2. For example, the width w of the choke cavity 111 is equal to one fourth of the wavelength corresponding to the center frequency of the operating frequency band of the second frequency band radiating element 2. The width of the choke cavity 111 is a dimension of the choke cavity 111 in the second direction X. With the foregoing dimensions, a choke effect of the choke cavity 111 can be more significant. It should be noted that, in this embodiment of this disclosure, there is no special limitation on a layout relationship between the first frequency band radiating elements 1 and the second frequency band radiating elements 2, provided that a mechanical size restriction is met and the first frequency band radiating elements 1 and the second frequency band radiating elements 2 can be deployed under a same physical caliber.

Figure 13:
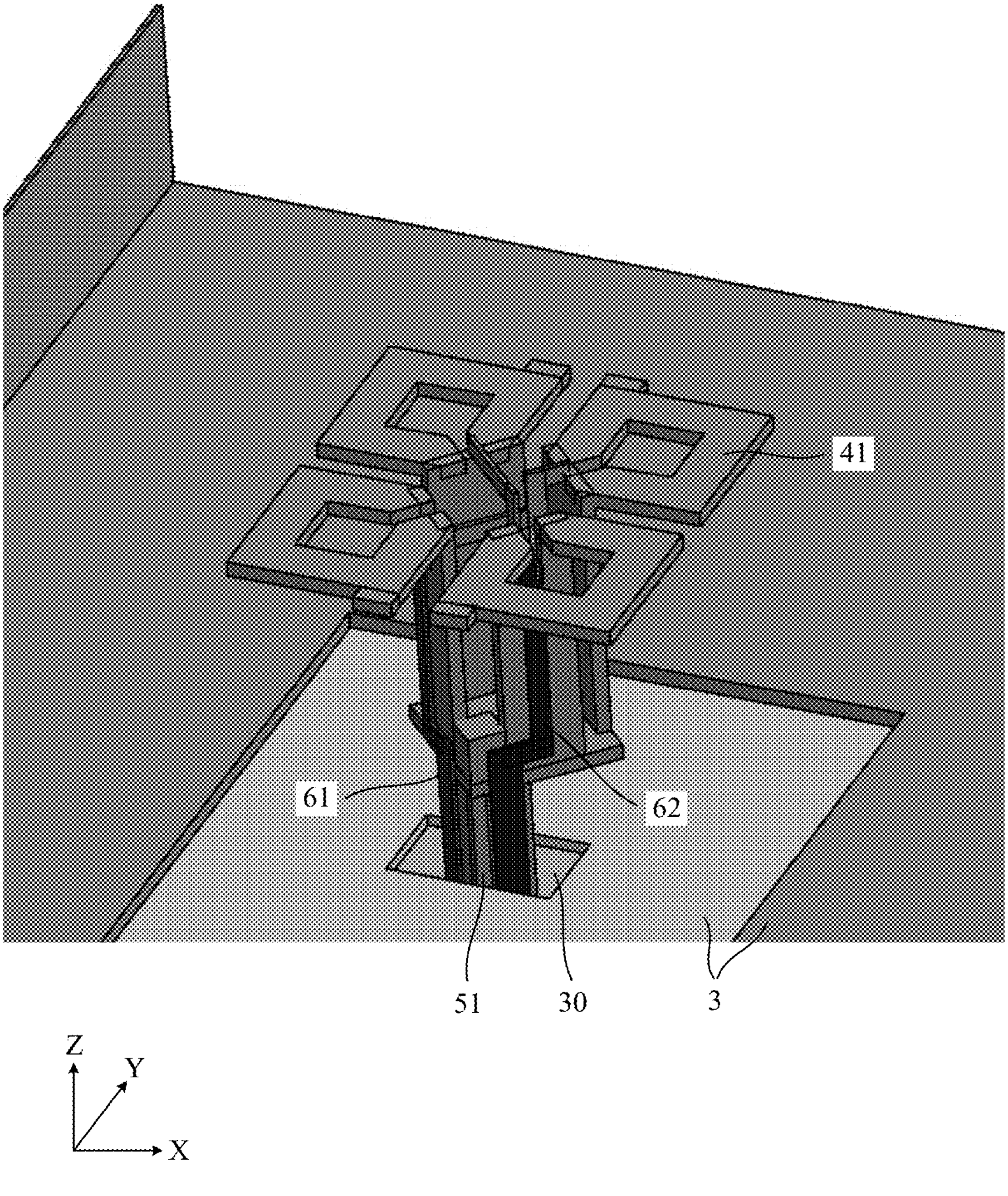
FIG. 13 is a three-dimensional enlarged diagram of a partial structure in FIG. 5.

In a possible implementation, the first frequency band radiating element 1 is a dual-polarized radiating element. The first signal transmission structure 61 is configured to perform feeding in a first polarization direction, the second signal transmission structure 62 is configured to perform feeding in a second polarization direction, and the first polarization direction may be perpendicular to the second polarization direction, to form a vertical dual-polarized radiating element. As shown in FIG. 13, the first frequency band radiating element 1 includes four first radiation structures 41. Two opposite first radiation structures 41 form one group, and there are two groups of radiation structures in total. One group of radiation structures corresponds to a polarization direction, and the other group of radiation structures corresponds to another polarization direction. The first signal transmission structure 61 performs feeding from one radiation structure in a same group to the other radiation structure, and the second signal transmission structure 62 performs feeding from one radiation structure in the other group to the other radiation structure.

Figure 14:
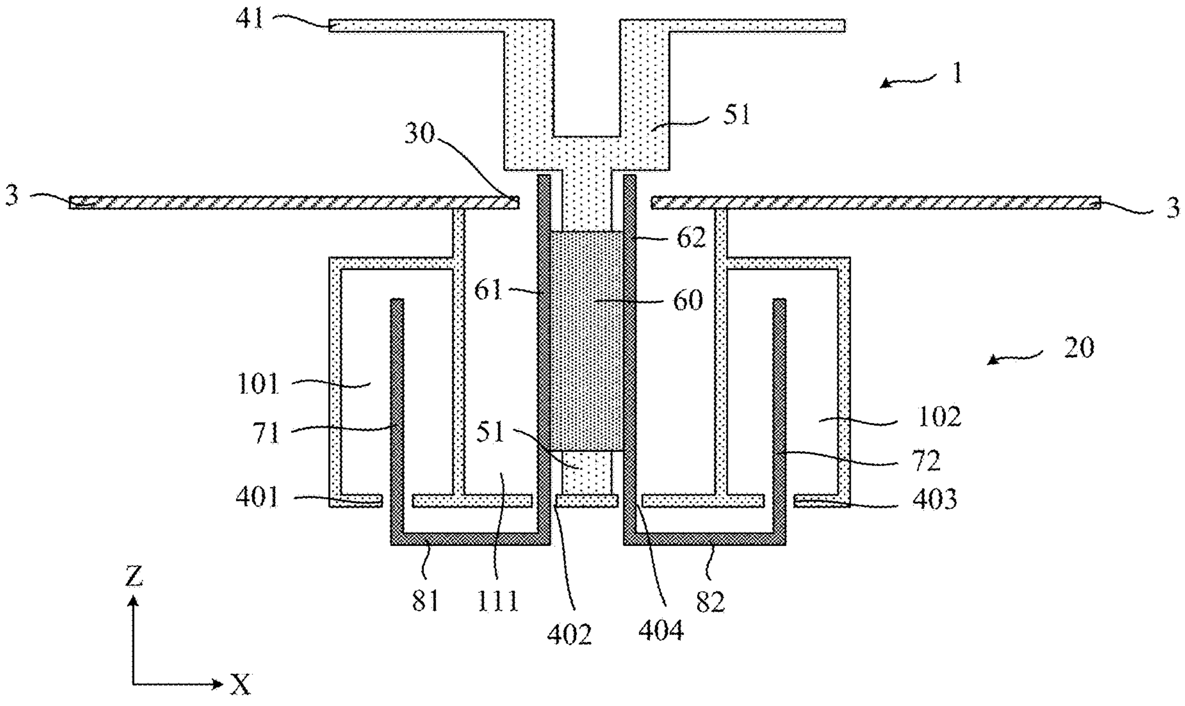
FIG. 14 is another diagram of FIG. 10.

In a possible implementation, as shown in FIG. 14, in the choke cavity 111, a dielectric material 60 is coated around the first balun structure 51, and the choke cavity 111 and the first balun structure 51 form a choke apparatus. An operating frequency band of the choke apparatus is used to suppress a signal of a corresponding frequency band. The operating frequency band of the formed choke apparatus may be controlled by setting a dielectric constant of the dielectric material 60 based on the dimensions of the choke cavity 111 and an effective length of the first balun structure 51 extending into the choke cavity 111.

In a possible implementation, an operating frequency band of the first frequency band radiating element 1 is greater than the operating frequency band of the second frequency band radiating element 2. That is, the first frequency band radiating element 1 is a high-frequency element in the antenna, and the second frequency band radiating element 2 is a low-frequency element in the antenna. For example, the operating frequency band of the first frequency band radiating element 1 is 1.4 GHz to 2.7 GHz, and the operating frequency band of the second frequency band radiating element 2 is 0.69 GHz to 0.96 GHz.

In a possible implementation, each second frequency band radiating element 2 includes a second radiation structure 42 and a second balun structure 52, the second radiation structure 42 and the second balun structure 52 are located on the first side of the reflection plate 3, and the second balun structure 52 is connected to the reflection plate 3.

Figure 15:
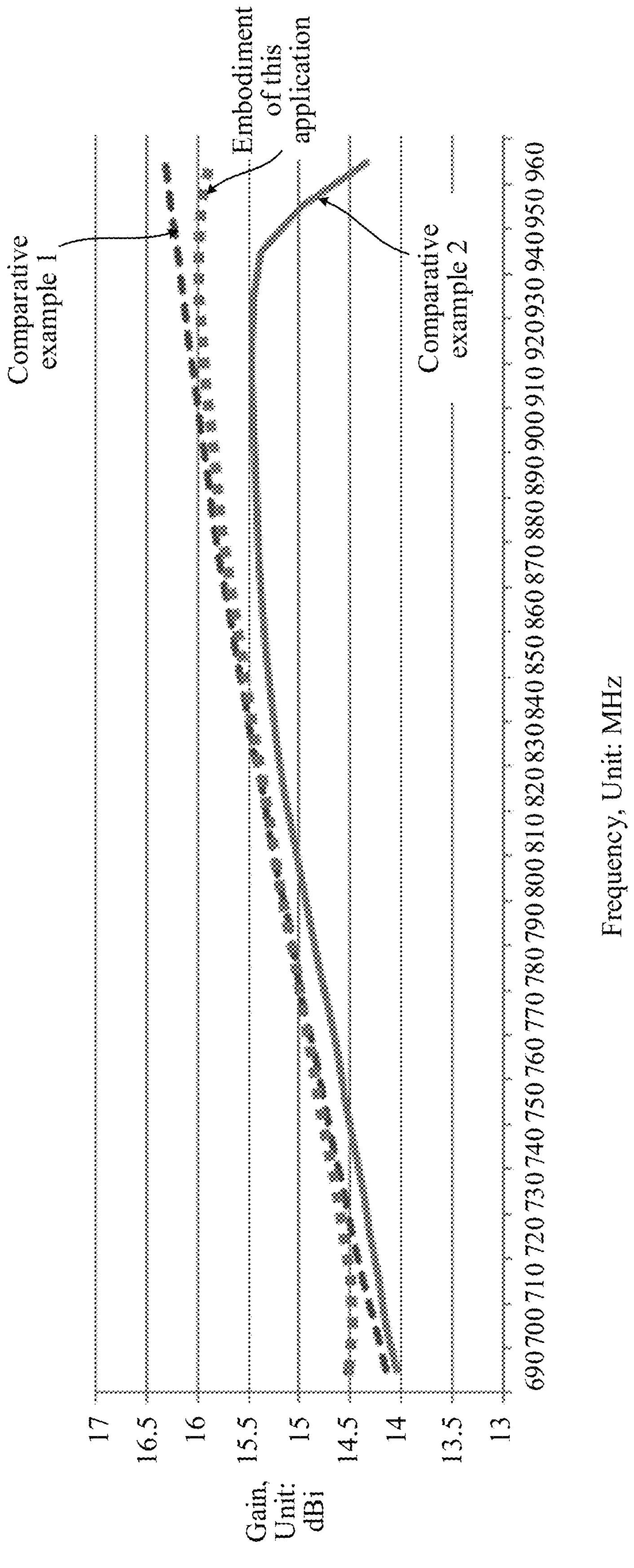
FIG. 15 is a simulation diagram of gain curves of antennas in a polarization direction on a frequency band of 0.69 GHz to 0.96 GHz according to an embodiment of this disclosure and comparative examples.
Figure 16:
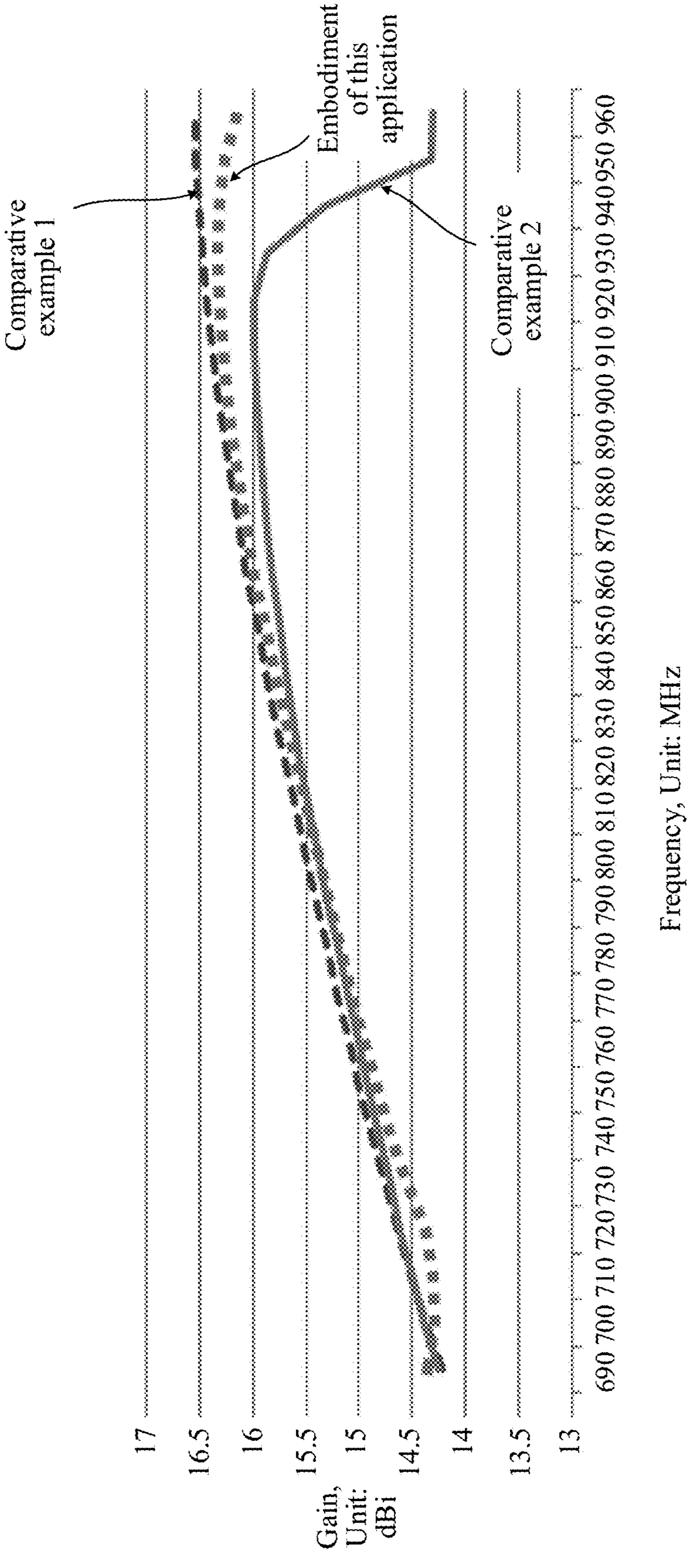
FIG. 16 is a simulation diagram of gain curves of antennas in another polarization direction on a frequency band of 0.69 GHz to 0.96 GHz according to an embodiment of this disclosure and comparative examples.
Figure 17:
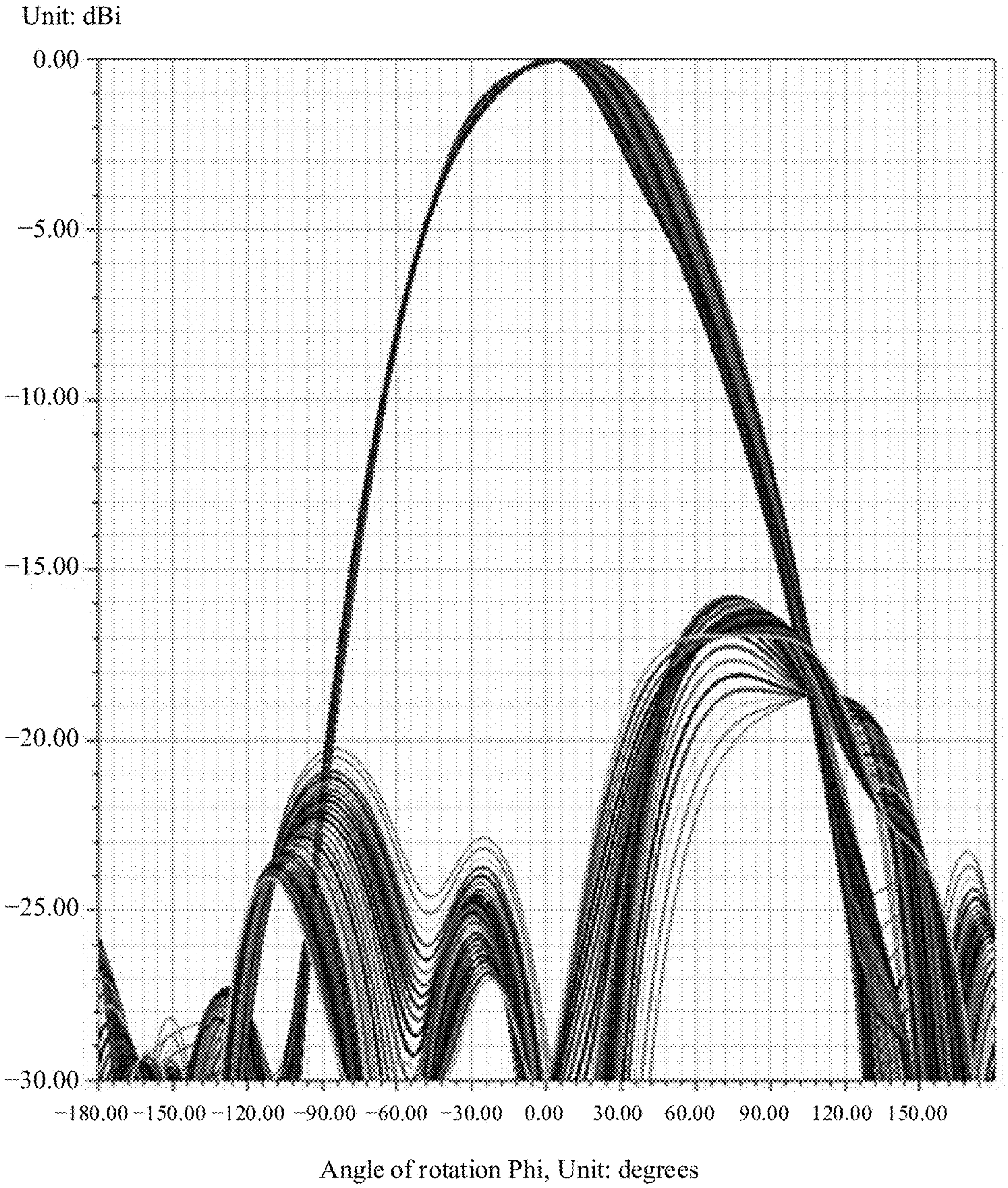
FIG. 17 is a directivity pattern of an antenna according to a comparative example 1.
Figure 18:
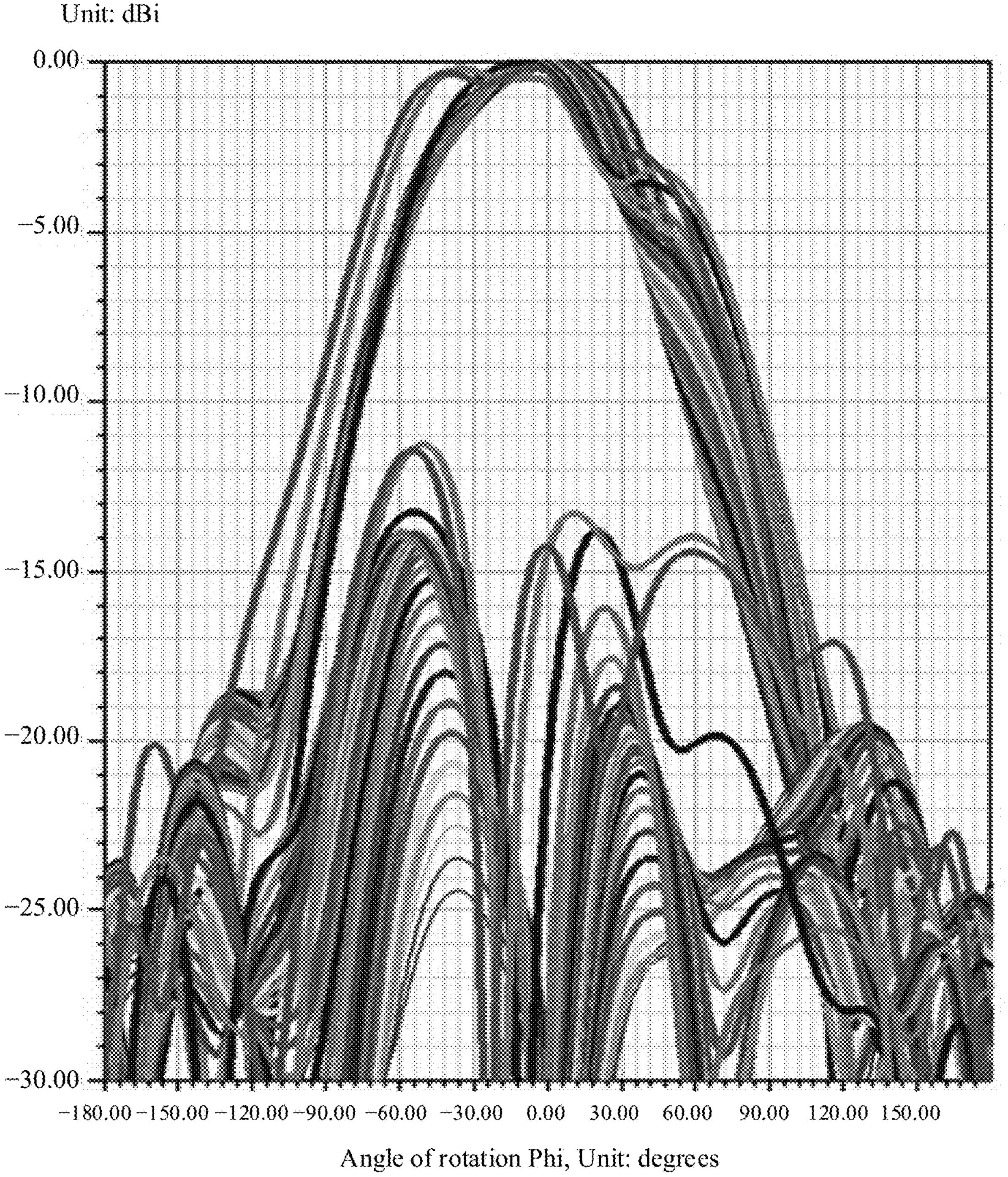
FIG. 18 is a directivity pattern of an antenna according to a comparative example 2.
Figure 19:
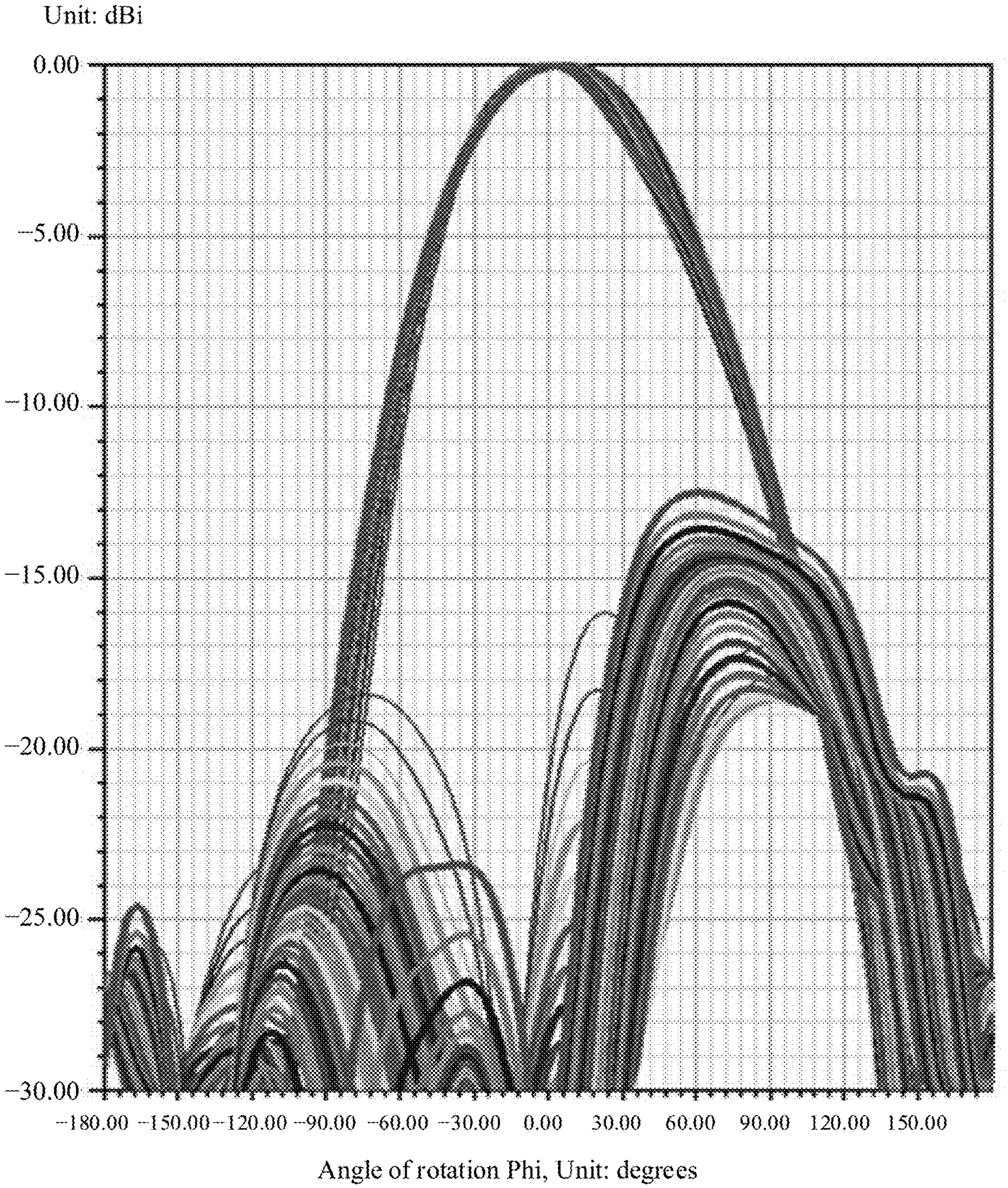
FIG. 19 is a directivity pattern of an antenna according to an embodiment of this disclosure.

The following describes an effect of this embodiment of this disclosure by comparing a simulation curve in this embodiment of this disclosure with simulation curves in comparative examples. As shown in FIG. 15 and FIG. 16, FIG. 15 is a simulation diagram of gain curves of antennas in a polarization direction on a frequency band of 0.69 GHz to 0.96 GHz according to this embodiment of this disclosure and comparative examples, and FIG. 16 is a simulation diagram of gain curves of antennas in another polarization direction on a frequency band of 0.69 GHz to 0.96 GHz according to this embodiment of this disclosure and comparative examples. A comparative example 1 indicates a simulation diagram of a gain curve of an antenna on which only a low-frequency radiating element whose operating frequency band is 0.69 GHz to 0.96 GHz is disposed and works and no radiating element on another frequency band is disposed. A comparative example 2 indicates a simulation diagram of a gain curve of an antenna on which a low-frequency radiating element whose operating frequency band is 0.69 GHz to 0.96 GHz and a high-frequency radiating element whose operating frequency band is 1.4 GHz to 2.7 GHz are directly connected together, that is, the low-frequency radiating element and the high-frequency radiating element are directly connected to a reflection plate. It can be learned from comparison of the foregoing three curves that a gain indicator of the antenna in this embodiment of this disclosure is basically equivalent to that of the antenna with no high-frequency radiating element. In other words, interference between radiating elements on different frequency bands in this embodiment of this disclosure is very small. As shown in FIG. 17 to FIG. 19, FIG. 17 shows a directivity pattern of the antenna in the comparative example 1, FIG. 18 shows a directivity pattern of the antenna in the comparative example 2, and FIG. 19 shows a directivity pattern of the antenna in this embodiment of this disclosure. It can be learned that a directivity pattern indicator of the antenna in this embodiment of this disclosure is basically equivalent to that of the antenna with no high-frequency radiating element. In other words, interference between radiating elements on different frequency bands in this embodiment of this disclosure is very small.

An embodiment of this disclosure further provides a base station device, including the antenna in any one of the foregoing embodiments. A specific structure and a principle of the antenna are the same as those in the foregoing embodiment, and are not described herein again. For a basic structure of the base station device, refer to FIG. 1 and FIG. 2 and related descriptions.

In embodiments of this disclosure, "at least one" means one or more, and "a plurality of" means two or more. The term "and/or" describes an association relationship between associated objects and represents that three relationships may exist. For example, A and/or B may represent the following cases: Only A exists, both A and B exist, and only B exists. A and B may be singular or plural. The character "/" generally indicates an "or" relationship between the associated objects. "At least one of the following" and similar expressions refer to any combination of these terms, including any combination of single or plural terms. For example, at least one of a, b, and c may represent: a, b, c, a and b, a and c, b and c, or a, b, and c, where a, b, and c may be singular or plural.

The foregoing descriptions are merely example of this disclosure, and are not intended to limit this disclosure. For a person skilled in the art, this disclosure may have various modifications and variations. Any modification, equivalent replacement, or improvement made without departing from the spirit and principle of this disclosure shall fall within the protection scope of this disclosure.

What is claimed is:

1. An antenna, comprising:

a plurality of first frequency band antenna groups that each comprise a phase shifter and a plurality of first frequency band radiating elements; and a reflection plate having a plurality of reflection plate through holes corresponding to the respective first frequency band radiating elements;

wherein each of the first frequency band radiating elements comprises:

a first radiation structure located on a first side of the reflection plate;

a first balun structure having a first part and a second part and passing through one of the plurality of reflection plate through holes that corresponds to the each of the first frequency band radiating elements, wherein the first part of the first balun structure is located on the first side of the reflection plate and the second part of the first balun structure is located on a second side of the reflection plate, the first part of the first balun structure is connected to the first radiation structure, and the first balun structure is spaced from the reflection plate; and a first signal transmission structure, wherein the first signal transmission structure is spaced from the first balun structure, and the first signal transmission structure passes through the reflection plate through hole;

wherein the phase shifter is located on the second side of the reflection plate, the phase shifter comprises a first phase shifter cavity, a choke cavity, and a first feed network signal transmission structure located in the first phase shifter cavity, and the choke cavity and the first phase shifter cavity share a part of a cavity wall;

in each of the first frequency band antenna groups, the second part of the first balun structure in each of the first frequency band radiating elements is located in the choke cavity; and in each of the first frequency band antenna groups, the first signal transmission structure in each of the first frequency band radiating elements is electrically connected to the first feed network signal transmission structure.

2. The antenna of claim 1, wherein each of the first frequency band radiating elements further comprises a second signal transmission structure, the second signal transmission structure is spaced from the first balun structure, and the second signal transmission structure passes through the reflection plate through hole;

the phase shifter further comprises a second phase shifter cavity and a second feed network signal transmission structure located in the second phase shifter cavity, wherein the choke cavity and the second phase shifter cavity share a first cavity wall that is located between the choke cavity and the second phase shifter cavity, and the first phase shifter cavity and the second phase shifter cavity are located on two opposite sides of the choke cavity, respectively; and in each of the first frequency band antenna groups, the second signal transmission structure in each of the first frequency band radiating elements is electrically connected to the second feed network signal transmission structure.

3. The antenna of claim 2, wherein each of the first frequency band radiating elements further comprises a first signal exporting structure located outside the choke cavity and outside the first phase shifter cavity; wherein a first signal connection hole corresponding to the first signal exporting structure is provided on a second cavity wall that is a bottom cavity wall of the first phase shifter cavity;

a second signal connection hole corresponding to the first signal exporting structure is provided on a third cavity wall that is a bottom cavity wall of the choke cavity; and the first signal exporting structure is connected to the first signal transmission structure through the corresponding second signal connection hole, and the first signal exporting structure is connected to the first feed network signal transmission structure through the corresponding first signal connection hole;

wherein each of the first frequency band radiating elements further comprises a second signal exporting structure located outside the choke cavity and outside the second phase shifter cavity;

wherein a third signal connection hole corresponding to the second signal exporting structure is provided on a fourth cavity wall that is a bottom cavity wall of the second phase shifter cavity;

a fourth signal connection hole corresponding to the second signal exporting structure is provided on the third cavity wall that is the bottom cavity wall of the choke cavity; and the second signal exporting structure is connected to the second signal transmission structure through the corresponding fourth signal connection hole, and the second signal exporting structure is connected to the second feed network signal transmission structure through the corresponding third signal connection hole.

4. The antenna of claim 1, wherein the cavity wall between the choke cavity and the first phase shifter cavity is electrically connected to the reflection plate;

a cavity wall between the choke cavity and the second phase shifter cavity is electrically connected to the reflection plate; and an end that is of the second part of the first balun structure in the choke cavity and that is away from the reflection plate is connected to a bottom cavity wall of the choke cavity.

5. The antenna of claim 2, wherein the antenna further comprises a plurality of second frequency band radiating elements;

in each of the plurality of first frequency band antenna groups, the plurality of first frequency band radiating elements are arranged in a first direction, the first phase shifter cavity, the choke cavity, and the second phase shifter cavity are arranged in a second direction, the first direction is perpendicular to the second direction, and the first direction and the second direction are both parallel to a plane on which the reflection plate is located;

a height of the choke cavity is less than one half of a wavelength corresponding to a center frequency of an operating frequency band of the second frequency band radiating elements, and the height of the choke cavity is a dimension of the choke cavity in a direction perpendicular to the plane on which the reflection plate is located; and a width of the choke cavity is less than one third of the wavelength corresponding to the center frequency of the operating frequency band of the second frequency band radiating elements, and the width of the choke cavity is a dimension of the choke cavity in the second direction.

6. The antenna of claim 2, wherein the first frequency band radiating element is a dual-polarized radiating element, the first signal transmission structure is configured to perform feeding in a first polarization direction, and the second signal transmission structure is configured to perform feeding in a second polarization direction.

7. The antenna of claim 1, wherein in the choke cavity, a dielectric material is coated around the first balun structure.

8. The antenna of claim 1, wherein the antenna further comprises a plurality of second frequency band radiating elements;

an operating frequency band of the first frequency band radiating element is greater than an operating frequency band of the second frequency band radiating elements.

9. The antenna of claim 1, the antenna further comprising a plurality of second frequency band radiating elements that each comprise a second radiation structure and a second balun structure, wherein the second radiation structure and the second balun structure are located on the first side of the reflection plate, and the second balun structure is connected to the reflection plate.

10. A base station device, comprising:

a plurality of first frequency band antenna groups that each comprise a phase shifter and a plurality of first frequency band radiating elements; and a reflection plate having a plurality of reflection plate through holes corresponding to the respective first frequency band radiating elements;

wherein each of the first frequency band radiating elements comprises:

a first radiation structure located on a first side of the reflection plate;

a first balun structure having a first part and a second part and passing through one of the plurality of reflection plate through holes that corresponds to the each of the first frequency band radiating elements, wherein the first part of the first balun structure is located on the first side of the reflection plate and the second part of the first balun structure is located on a second side of the reflection plate, the first part of the first balun structure is connected to the first radiation structure, and the first balun structure is spaced from the reflection plate; and a first signal transmission structure, wherein the first signal transmission structure is spaced from the first balun structure, and the first signal transmission structure passes through the reflection plate through hole;

wherein the phase shifter is located on the second side of the reflection plate, the phase shifter comprises a first phase shifter cavity, a choke cavity, and a first feed network signal transmission structure located in the first phase shifter cavity, and the choke cavity and the first phase shifter cavity share a part of a cavity wall;

in each of the first frequency band antenna groups, the second part of the first balun structure in each of the first frequency band radiating elements is located in the choke cavity; and in each of the first frequency band antenna groups, the first signal transmission structure in each of the first frequency band radiating elements is electrically connected to the first feed network signal transmission structure.

11. The base station device of claim 10, wherein each of the first frequency band radiating elements further comprises a second signal transmission structure, the second signal transmission structure is spaced from the first balun structure, and the second signal transmission structure passes through the reflection plate through hole;

the phase shifter further comprises a second phase shifter cavity and a second feed network signal transmission structure located in the second phase shifter cavity, wherein the choke cavity and the second phase shifter cavity share a first cavity wall that is located between the choke cavity and the second phase shifter cavity, and the first phase shifter cavity and the second phase shifter cavity are located on two opposite sides of the choke cavity, respectively; and in each of the first frequency band antenna groups, the second signal transmission structure in each of the first frequency band radiating elements is electrically connected to the second feed network signal transmission structure.

12. The base station device of claim 11, wherein each of the first frequency band radiating elements further comprises a first signal exporting structure located outside the choke cavity and outside the first phase shifter cavity; wherein a first signal connection hole corresponding to the first signal exporting structure is provided on a second cavity wall that is a bottom cavity wall of the first phase shifter cavity;

a second signal connection hole corresponding to the first signal exporting structure is provided on a third cavity wall that is a bottom cavity wall of the choke cavity; and the first signal exporting structure is connected to the first signal transmission structure through the corresponding second signal connection hole, and the first signal exporting structure is connected to the first feed network signal transmission structure through the corresponding first signal connection hole;

wherein each of the first frequency band radiating elements further comprises a second signal exporting structure located outside the choke cavity and outside the second phase shifter cavity;

a third signal connection hole corresponding to the second signal exporting structure is provided on a fourth cavity wall that is a bottom cavity wall of the second phase shifter cavity;

a fourth signal connection hole corresponding to the second signal exporting structure is provided on the third cavity wall that is the bottom cavity wall of the choke cavity; and the second signal exporting structure is connected to the second signal transmission structure through the corresponding fourth signal connection hole, and the second signal exporting structure is connected to the second feed network signal transmission structure through the corresponding third signal connection hole.

13. The base station device of claim 10, wherein the cavity wall between the choke cavity and the first phase shifter cavity is electrically connected to the reflection plate;

a cavity wall between the choke cavity and the second phase shifter cavity is electrically connected to the reflection plate; and an end that is of the second part of the first balun structure in the choke cavity and that is away from the reflection plate is connected to a bottom cavity wall of the choke cavity.

14. The base station device of claim 11, wherein the antenna further comprises a plurality of second frequency band radiating elements;

in each of the plurality of first frequency band antenna groups, the plurality of first frequency band radiating elements are arranged in a first direction, the first phase shifter cavity, the choke cavity, and the second phase shifter cavity are arranged in a second direction, the first direction is perpendicular to the second direction, and the first direction and the second direction are both parallel to a plane on which the reflection plate is located;

a height of the choke cavity is less than one half of a wavelength corresponding to a center frequency of an operating frequency band of the second frequency band radiating elements, and the height of the choke cavity is a dimension of the choke cavity in a direction perpendicular to the plane on which the reflection plate is located; and a width of the choke cavity is less than one third of the wavelength corresponding to the center frequency of the operating frequency band of the second frequency band radiating elements, and the width of the choke cavity is a dimension of the choke cavity in the second direction.

15. The base station device of claim 11, wherein the first frequency band radiating element is a dual-polarized radiating element, the first signal transmission structure is configured to perform feeding in a first polarization direction, and the second signal transmission structure is configured to perform feeding in a second polarization direction.

16. The base station device of claim 10, wherein in the choke cavity, a dielectric material is coated around the first balun structure.

17. The base station device of claim 10, wherein the antenna further comprises a plurality of second frequency band radiating elements;

an operating frequency band of the first frequency band radiating element is greater than an operating frequency band of the second frequency band radiating elements.

18. The base station device of claim 10, further comprising a plurality of second frequency band radiating elements that each comprise a second radiation structure and a second balun structure, wherein the second radiation structure and the second balun structure are located on the first side of the reflection plate, and the second balun structure is connected to the reflection plate.

* * * * *